United States Patent [19]

Anson et al.

[11] Patent Number: 5,008,339

[45] Date of Patent: Apr. 16, 1991

[54] NOVEL POLYELECTROLYTE COPOLYMER AND MIXED POLYMERS AND COMPOSITES THEREOF

[75] Inventors: Fred C. Anson, Altadena; Donald D. Montgomery, Pasadena, both of Calif.

[73] Assignee: California Institute of Technology, Pasadena, Calif.

[21] Appl. No.: 216,847

[22] Filed: Jul. 8, 1988

Related U.S. Application Data

[63] Continuation of Ser. No. 5,008, Jan. 20, 1987, abandoned, which is a continuation-in-part of Ser. No. 680,795, Dec. 12, 1984, abandoned.

[51] Int. Cl.$^5$ ................................................ C08F 8/30
[52] U.S. Cl. .................................. 525/181; 525/178; 525/193; 525/203; 525/204; 428/367
[58] Field of Search ............... 525/203, 178, 193, 181, 525/204; 428/367

[56] References Cited

U.S. PATENT DOCUMENTS

| | | | |
|---|---|---|---|
| 3,271,496 | 9/1966 | Michaels | 525/203 |
| 3,619,394 | 11/1971 | Battaerd | 526/310 |
| 3,849,172 | 11/1974 | Chin et al. | 525/203 |
| 3,933,717 | 1/1976 | Shinohara et al. | 525/379 |
| 3,944,424 | 3/1976 | Cohen et al. | 525/379 |
| 4,087,599 | 5/1978 | Roe et al. | 526/46 |
| 4,311,799 | 1/1982 | Miyake et al. | 521/31 |
| 4,347,339 | 8/1982 | Boevink | 525/180 |
| 4,482,680 | 11/1984 | Sheldon | 525/331.4 |
| 4,513,122 | 4/1985 | Hansson | 525/332.3 |

FOREIGN PATENT DOCUMENTS 55-120609   9/1980   Japan .

OTHER PUBLICATIONS

Anson, F. C. et al., J. Am. Chem. Soc., 1983, 105, 1096.
Oyama, N. et al., J. Electroanal. Chem., 139 (1982) 371-382.

Primary Examiner—Melvyn I. Marquis
Assistant Examiner—R. Dean, Jr.
Attorney, Agent, or Firm—Marvin E. Jacobs

[57] ABSTRACT

A mixed polymer material is formed of a polyelectrolyte ternary copolymer having a hydrophobic backbone and containing 10 to 90 percent unsubstituted portions and the remainder being substituted with hydrophilic groups such as a styrene ternary copolymer of the formula:

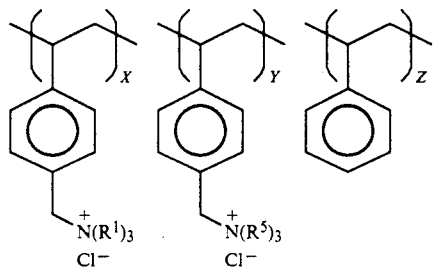

where $R^1$ is alkyl, preferably ethyl, and $R^5$ is hydroxyalkyl, preferably hydroxethyl. The ternary copolymer self-segregates into discrete hydrophilic and hydrophobic domains and is believed to act as a template to segregate the polyelectrolyte into the domains. The mixed polymer has large ion-exchange capacity, very high effective diffusion constants of incorporated counterions and prolonged retention of multiply-charged counter-ions. The mixed polymer forms a stable and effective coating for electrodes for electrocatalytic applications.

14 Claims, 2 Drawing Sheets

NOVEL POLYELECTROLYTE COPOLYMER AND MIXED POLYMERS AND COMPOSITES THEREOF

This is a continuation of application Ser. No. 005,008, filed Jan. 20, 1987 now abandoned which is a Continuation-In-Part of prior application Ser. No. 680,795, filed Dec. 12, 1984 now abandoned.

Origin of the Invention

The invention was made utilizing funds granted by the National Science Foundation under Grant No. INT-8909199 and by the Department of Defense under U.S. Army Research Office Contract No. DAAG29-83-K-0174.

BACKGROUND OF THE INVENTION

The present invention relates to novel polyelectrolytes and mixtures thereof with cationic polymers and, more particularly, this invention relates to polyquaternary terpolymers and membranes of films prepared from mixtures of the terpolymer with various cationic homopolymeric polyelectrolytes.

Electrode surfaces have been modified by grafting cationic compounds, such as the bipyridinum compound, methyl viologen, or by adhering a coating of polyelectrolyte to the surface to provide the surface with high affinity for counter ion reactants. These reactants can be incorporated into the polyelectrolyte layer by ion-exchange. This tactic was first demonstrated with poly-4-vinyl pyridine (Oyama, N., Anson, F. C., J. Electrochem. Soc., 1980, 127, 247). Numerous polyelectrolytes have since been tried as electrode coatings (Majda, M., Faulkner, L. R., J. Electroanal. Chem., 1984, 169, 77 and the references cited therein).

Previously available polyelectrolyte systems useful for coating electrodes lack one or more of the essential properties required for effective electrode coatings. These include strong, irreversible binding of the polyelectrolyte to electrode surfaces, reasonable ion-exchange capacities of the coatings, retention of counterionic reactants by the coatings for long periods in solution containing none of the counter-ions, rapid charge propagation rates within the coatings and reasonable chemical and mechanical stability. Most commonly available ionic polymers are either too soluble in water or support facile counter-ion exchange so that incorporated ionic reactants are rapidly lost from the polyelectrolyte electrode coating.

Of the polyelectrolytes that have been applied to electrode surfaces in order to bind electroactive counter-ions, the one which has exhibited the most of these desired properties is a block copolymer based on poly (1-lysine), PLC (Anson, F. C., Saveant, J. M., Shigehara, K. J., Am. Chem. Soc., 1983, 105, 1096). For example, PLC provides much higher charge propagation rates than are available with otherwise attractive coatings prepared from Nafion (a fluorinated, sulfonated polymer). Coatings of protonated or quaternized poly (4-vinylpyridine), PVP or QPVP, are less adherent than PLC and much inferior in retaining incorporated anions when transferred to pure supporting electrolyte solutions. The latter shortcoming is also shared by non-cross-linked polystyrene sulfonate.

STATEMENT OF THE INVENTION

A new material for preparing polyelectrolyte coatings on electrode surfaces is provided by the present invention. The polyelectrolyte exhibits large ion-exchange capacities, remarkably high effective diffusion coefficients of incorporated counter-ions and prolonged retention of multiply-charged counter-ions.

The polyelectrolyte coating consists of a mixture of a first cationic copolymer containing two types of quaternized amino groups and a second cationic homopolymer. The homopolymers are too soluble to yield stable coatings when used alone. The hydrophobic elements in the mixture of polyelectrolytes are believed to provide insolubility in the aqueous electrolyte and to provide binding to the electrode surface. The hydrophilic groups are believed to provide swellability which increases ion transport into and across the coatings.

Electron microscopy reveals that films prepared from the mixed polyelectrolytes spontaneously segregate into discrete hydrophilic and hydrophobic domains. The domains appear to be larger than in previous block polymers. Usually, domains found in block polymers are about 50 Å in diameter. Nafion forms large domains of the order of 150 to 200 Å. The domains found in the cationic copolymer of the invention are of the order of 1000 Å. The self-segregating tendency of the cationic copolymer causes it to exert a strong influence on the internal structure of coatings prepared from its mixture with other polyelectrolytes. The copolymer appears to act as a template that defines the internal morphology of the composite coating. Mixtures of the copolymer of the invention with a variety of homopolyelectrolytes yield coatings with essentially similar structures, ion-exchange and charge-propagation properties. The mixed polymer is also found to contain large domains of the order of 1000 Å. The results lead to the conclusion that internal morphology, far more than chemical composition, is the dominant factor that determines the behavior of the coatings.

Homopolymeric polyelectrolytes that are too soluble to produce stable coatings when employed alone produce electrode coatings when mixed with the copolymer of the invention with properties that are superior to those of any previously described material. (1) Large quantities of counterionic reactants are incorporated by the mixed polymer, composite coating and are retained for extended periods. (2) The incorporated reactants are able to diffuse rapidly within the coatings so that unusually high current densities for their oxidation and reduction can be realized. This combination of properties is essential in applications where the incorporated reactants are to serve as electrocatalysts or redox mediators and has not been achievable with prior materials.

The first copolymer of the invention has a hydrophobic, homocarbon backbone which may be substituted with hydrogen, fluorine or other hydrophobic group, suitably a polyvinyl backbone having 10 to 80 percent of the vinyl monomer units unsubstituted, and having the remaining 20 to 90 percent of the monomeric vinyl units substituted with at least one pendant cationic quaternary amine group selected from

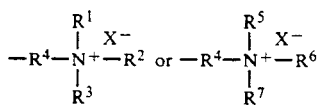

where $R^1$, $R^2$ and $R^3$ are the same or different aliphatic or aromatic groups, preferably an alkyl group containing 1 to 6 carbon atoms, $R^4$ is alkylene, arylene or alkarylene of 1 to 18 carbon atoms, and $R^5$, $R^6$, $R^7$ are the same or different hydroxy aliphatic or hydroxy aromatic groups, prefereably hydroxyalkyl containing 1 to 6 carbon atoms. X can be any anion, preferably halide such as chloride. Preferred materials contain a random distribution of 10 to 35 molecular percent of trialkyl ($C_1$ to $C_6$) amine substituted $R^4$ groups, 15 to 45 molecular percent of tri-hydroxyalkyl ($C_1$ to $C_6$) amine substituted $R^4$ groups and 15 to 45 molecular percent of unsubstituted groups of the formula:

Ternary polymers that are very effective in forming large domains and high performance electrode coatings are substituted polystyrene containing a random distribution of the following structures:

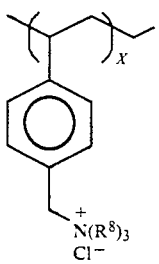

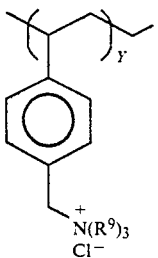

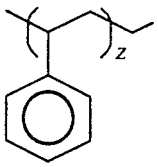

where X is 0.1 to 0.35, Y is 0.15 to 0.45 and Z is 0.15 to 0.45, and $R^8$ is prefereably ethyl and $R^9$ is preferably hydroxyethyl.

The copolymer of the invention possesses the ability to self-organize into hydrophilic and hydrophobic domains when cast from solution. The copolymer of the invention is believed to act as a template incorporating into the domain pattern and, thus, stabilizing simple cationic polyelectrolytes that are otherwise unstable. The polyelectrolyte imparts a synergistic improvement in ion-exchange capabilities to the mixed polyelectrolyte film. The coatings produced by the invention have very high effective diffusion coefficients for incorporated counterions and are believed to be the most stable polycationic materials that have been described for use in the electrochemical environment of a cell.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
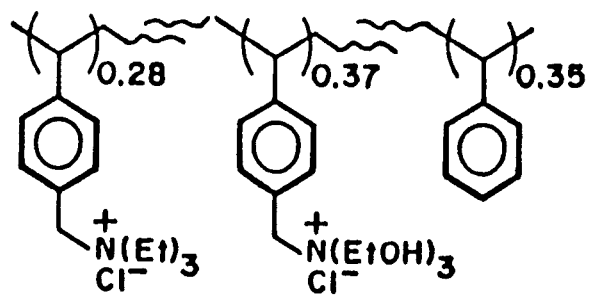
FIG. 1 is a structural formula for a ternary polymer in accordance with this invention.

Referring now to FIG. 1, a ternary copolymer containing both hydrophobic styrene groups and hydrophilic quaternized amino styrene groups is illustrated. The ternary copolymer is prepared from a binary copolymer of styrene and a $XR^8$ - substituted styrene where X is chloro or bromo and $R^8$ is alkylene of 1 to 3 carbon atoms. The copolymer contains 10 to 80 percent styrene, the remainder being the haloalkyl-substituted styrene. The random, binary copolymer is prepared according to standard procedure in aqueous media in presence of a free radical initiator such as azobisisobutyronitrile (AIBN). The binary copolymer can be converted to the quaternery, cationic form by the Menschutken reaction by reaction with a tertiary amine of the formula:

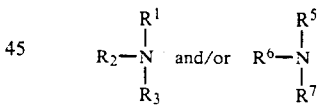

The preferred procedure is to first react the binary copolymer with the trialkyl amine followed by reaction with the tri-hydroxyalkyl amine. The resultant ternary copolymer is purified by dissolving in concentrated acid and dialyzing it against water to remove unreacted amine and low molecular weight impurities.

The ternary copolymer can then be mixed with conventional cationic polyelectrolytes over wide ranges of molar ratios, typically from 10 to 90 percent by weight. The polyelectrolyte is a linear or branched polymer soluble in solvent and can be any polyelectrolyte containing hydrophilic groups such as amine, imide, amide, etc. The polyelectrolyte can be a homopolymer or a copolymer as long as it is soluble insolvent and contains cationic groups. Suitable electrolytes are poly(N-vinylimidazole)=PVI; poly (4-vinylpyridine)=PVP; Nylon derivative #1=—NH[(CH$_2$)$_4$—CH$_2$-]$_4$—CH[N(CH$_3$)$_2$—CH(O)]; Nylon derivative #2, branched poly (ethyleneimine)=PEI, linear poly (ethyleneimine)=l-PEI and poly l-lysine=PLL.

The ternary copolymer is dissolved in a highly polar aprotic solvent such as tetrahydrofuran (THF), dimethyl acetamide (DMA), dimethyleformamide (DMF) or a sulfolane such as dimethylsulfoxide (DMSO). The ternary copolymer solution that is used to form the mixed or composite polymer preferably contains at least 10 percent by volume of a highly polar protic solvent such as water, usually from 15 to 50 percent by volume. This mixture of solvents is believed to participate in the domain-forming self segregating process. The polyelectrolyte is dissolved in a compatible, miscible solvent such as a lower alkanol, suitably methanol. The ternary copolymer solution and the polyelectrolyte solution are then mixed, cast onto the surface of an electrode and solvent removed by evaporation to form a film. The polymer solutions are each usually fairly dilute, from 0.1 to 5 wt. percent and are combined in the ratio desired for the final polymer, usually in equal volume.

The mechanical stability of the coating or layer can be significantly improved by dissolving a small amount, typically from 0.1 to 10 percent by weight of a polymerizable monomer such as isoprene in the mixed polymer solution and polymerizing the monomer before all the liquid has been evaporated. The presence of liquid maintains the domains from collapsing until the monomer has polymerized. The monomer can be addition polymerizable or can contain condensible functional groups. Radiation polymerizable monomers such as isoprene, styrene or divinyl-benzene are preferred. The monomer may form cross-links between polyelectrolyte and/or ternary copolymer chains or may polymerize to form chains which mechanically link or interconnect portions of the film. The solvent can then be evaporated to form a film which can be dried without collapse of the domains. Examples follow:

EXAMPLE I

Figure 2:
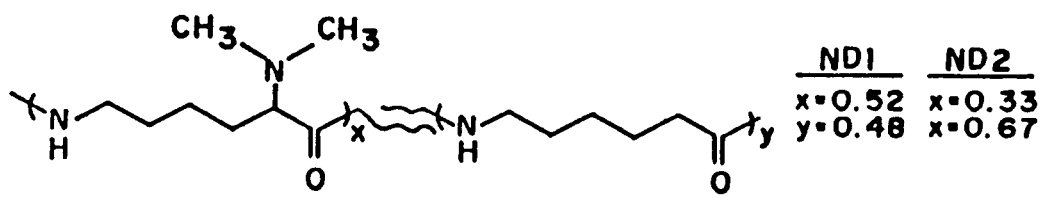
FIG. 2 is a structural formula for linear polyamide derivatives ND1 and ND2.

The random ternary polymer, shown in FIG. 1, was prepared as follows: A benzene solution containing 0.6 M styrene, 2.4 M chloromethylstyrene and $6 \times 10^{-2}$ M azoisobutyronitrie (AIBN) was degassed on a vacuum line according to standard procedures. The polymerization was allowed to proceed for 24 hours at 60° C. which consumed about 70 percent of the monomers. The resulting random binary copolymer was isolated and purified by reprecipitation from n-hexane. The groups in the copolymer were converted to quaternary amine groups using first triethyl amine and subsequently triethanol amine. The resulting ternary copolymer was dissolved in concentrated HCl and dialyzed against water for two days to remove unreacted amine and other low molecular weight impurities. The aqueous polyelectrolyte solution became quite turbid during the course of the dialysis and THF was added at this point to improve the solubility of the polyelectrolyte. The resulting solvent ration (THF:$H_2O$) for the slightly turbid one wt. percent solution of the polyelectrolyte was ca. 1:1. The final 0.5 wt. percent polyelectrolyte solution from which the coatings were prepared was approximately 25 percent $H_2O$ by volume (0.67 M THF/1.0 M $H_2O$) and remained slightly turbid. The composition of the ternary copolymer was determined by elemental analysis for Cl and N as well as infrared spectroscopy. Its molecular weight was not estimated. Poly-(N-vinylmethylimidazole) of average molecular weight, $7 \times 10^4$ daltons, and the functionalized Nylons (FIG. 2) were prepared by standard procedures. All other polyelectrolytes employed were commercially available samples that were used as received.

EXAMPLE II

Supporting electrolyte solutions consisted of 0.1 M sodium acetate adjusted to pH 4.5 with glacial acetic acid. Laboratory distilled water was purified by passage through a purification train (Barnstead Nanopure). Solutions of $K_4Fe(CN)_6$ were prepared from the analytical grade salt immediately prior to the experiment in which they were employed. Glassy carbon electrodes (Tokai Electrode Manuf. Co., Ltd., Tokyo) having an area of 0.34 cm$^2$ were mounted and prepared as previously described. The hanging mercury drop electrode was conventional (Brinkmann Instruments, Inc.) was filled with triply distilled mercury (Bethlehem Instruments Co.).

Cyclic voltammetry was conducted with conventional previously described procedures and instrumentation. The quantities of $Fe(CN)_6^{4-}$ incorporated in the electrode coatings were measured coulometrically after transfer of the electrode to the pure supporting electrolyte solution. The potential was scanned immediately at 2 mV s$^{-1}$ to a potential well beyond the peak potential and maintained at that point until the current had decreased to background levels (10–20 s). The total charge passed during the experiment was measured and used to calculate the total quantity of $Fe(CN)_6^{4-}$ in the coating. The slopes of chronocoulometric charge-(time)$^{\frac{1}{2}}$ plots were used to evaluate diffusion coefficients of $Fe(CN)_6^{4-}$ incorporated in electrode coatings.

The data were obtained with an Electrochemical Analyzer (Bioanalytical Systems, Model 100) and analyzed graphically. Relatively long measurement times were employed (25 ms) in order to avoid possible non-linearities arising from the uncompensated resistance presented by the coatings.

The structure of the random ternary copolymer examined in this study, I, is given in FIG. 1. Glassy carbon electrodes were coated with polyelectrolyte films by evaporation of aliquots of solutions containing i) I; ii) poly-(N-vinylmethylimidizole), PVI; and iii) a mixture of I and PVI. In each case the solvent was 1:1 mixture of aqueous tetrahydrofuran and methanol. The ion-exchange and retention capabilities of the resulting coatings were tested by $\Gamma_o$, from dilute solutions of the multiply-charged counter anion and also the quantity of the incorporated $Fe(CN)_6^{4-}$ that was retained 45 minutes after the electrode was transferred to a pure supporting electrolyte solution, $\Gamma$ 45.

EXAMPLE III

Polyelectrolyte mixtures used to cast electrode coatings were prepared by mixing in the barrel of a 10 ul syringe. 1 ul of a 0.5 weight percent solution of the random ternary copolymer of Example I in aqueous THAF with the same volume of a 0.5 weight percent solution in methanol of each of the cationic homopolymers examined. The resultant mixture was applied to the surface of a glassy carbon electrode (0.34 cm$^2$). After the solvents had evaporated (ca. 30 min. at 22° C.), the coated electrode was transferred to aqueous acetate buffer to carry out various electrochemical measurements as previously described by Oyama, N., Anson, F. C., *J. Electrochem. Soc.*, 1980, 127, 640.

Retention ratios and diffusion coefficients for Fe(CN) and other multiply-charged counterions incorporated into electrode coatings prepared from homopolymer polyelectrolytes are presented in Table I and into electrode coatings prepared from mixed-composites polyelectrolyte systems are presented in Table II.

TABLE I

Retention Ratios and Diffusion Coefficients for $Fe(CN)_6^{4-}$ and Other Multiply-Charged Counterions Incorporated in Electrode Coatings Prepared from Single Polyelectrolytes

| Coating[a] Material | $10^7 r_p{}^b$ mole cm$^{-2}$ | Counter-ion | $10^8 r_o{}^c$ mole cm$^{-2}$ | $r_{45}/r_o{}^d$ | $2r_o/r_p{}^e$ | $10^6 D_E{}^f$ cm$^2$ s$^{-1}$ |
|---|---|---|---|---|---|---|
| I | 0.45 | $Fe(CN)_6^{4-g}$ | 0.37 | 0.73 | 0.33 | —[k] |
| PVI | 1.55 | $Fe(CN)_6^{4-g}$ | 0.39 | 0.54 | 0.10 | —[k] |
| PVP | 5.37 | $Fe(CN)_6^{4-h}$ | 10.3 | — | 0.77 | 0.0038 |
| PLC | 2.8 | $Mo(CN)_8^{4-i}$ | — | — | 0.70 | 0.76 |
| Nafion | — | $Ru(NH)_6^{3+j}$ | — | — | — | 0.002 |

[a]Abbreviations:
I: See FIG. 1; PVI = poly(N-vinylmethylimidizole); PVP = poly(4-vinylpyridine); PLC: a block copolymer of lysine; Nafion: /
[b]Total quantity of fixed charge sites in the polyelectrolyte coating.
[c]Quantity of counter-ion incorporated by the coating as measured coulometrically immediately after transfer to pure supporting electrolyte.
[d]Retention Ratio: fraction of the initially incorporated counter-ion that was retained after 45 minutes of exposure to pure supporting electrolyte solution.
[e]Fraction of the fixed charge sites occupied by the electroactive counter-ions of charge Z.
[f]Effective diffusion coefficient of the multiply-charged counter-ions incorporated in the coating as measured chronocoulometrically in pure supporting electrolyte.
[g]Supporting electrolyte: 0.1 M $CH_3COONa$ + $CH_3COOH$ (pH 4.5); this study.
[h]Supporting electrolyte: 0.1 M $CF_3COONa$ + $CF_3COOH$ (pH 1.8);
[i]Supporting electrolyte: 0.2 M $COONa$ + $CH_3COOH$ (pH 5.5);
[j]Supporting electrolyte: 0.5 M $Na_2SO_4$;
[k]Uncertainty in coating thickness prevented evaluation of $D_E$.

TABLE 2

Retention Ratios and Diffusion Coefficients for $Fe(CN)_6^{4-}$ Incorporated in Electrode Coatings Prepared From Composite Polyelectrolyte Systems

| Coating[a] Material | $10^7 r_p{}^b$ mole cm$^{-2}$ | $10^8 r_o{}^c$ mole cm$^{-2}$ | $r_{45}/r_o{}^d$ | $4r_o/r_p{}^e$ | $10^6 D_E{}^f$ cm$^2$ s$^{-1}$ |
|---|---|---|---|---|---|
| PVI + 1[g] | 1.99 | 2.40 | 0.93 | 0.48 | 1.6 |
| PVP + 1[h] | 1.85 | 2.27 | 0.84 | 0.49 | 1.4 |
| PVP + 1[i] | 1.85 | 2.32 | 0.82 | 0.60 | 1.1 |
| PVP + 1[j] | 1.85 | 2.12 | 0.85 | 0.46 | 1.5 |
| ND1 + 1 | 1.39 | 2.18 | 0.88 | 0.63 | 1.5 |
| ND2 + 1 | 0.99 | 1.90 | 0.92 | 0.77 | 1.9 |
| ND3 + 1 | 0.83 | 1.12 | 0.84 | 0.54 | 4.9 |
| PEI + 1[k] | 3.87 | 3.96 | 0.82 | 0.41 | 3.6 |
| l-PEI + 1 | 3.87 | 4.64 | 0.87 | 0.48 | 2.9 |
| PLL + 1[l] | 1.16 | 2.15 | 0.83 | 0.74 | 2.1 |
| PVI + 1[m] | 7.22 | 0.30 | 0.91 | 0.46 | 1.4 |

[a]Abbreviations: 1: See FIG. 1; PV1 = poly(N-vinylmethlimidizole: PVP = poly(4-vinylpyridine); ND1: Nylon derivative # 1 =

$$-(N-(CH_2)_4-CH_2)_4-CH(N(CH_3)_2)-CH-)_n;$$
$$\quad\quad\quad\quad\quad\quad\quad\quad\quad\quad\quad\quad\quad\quad\quad\quad\quad\;\; O$$

Figure 3:
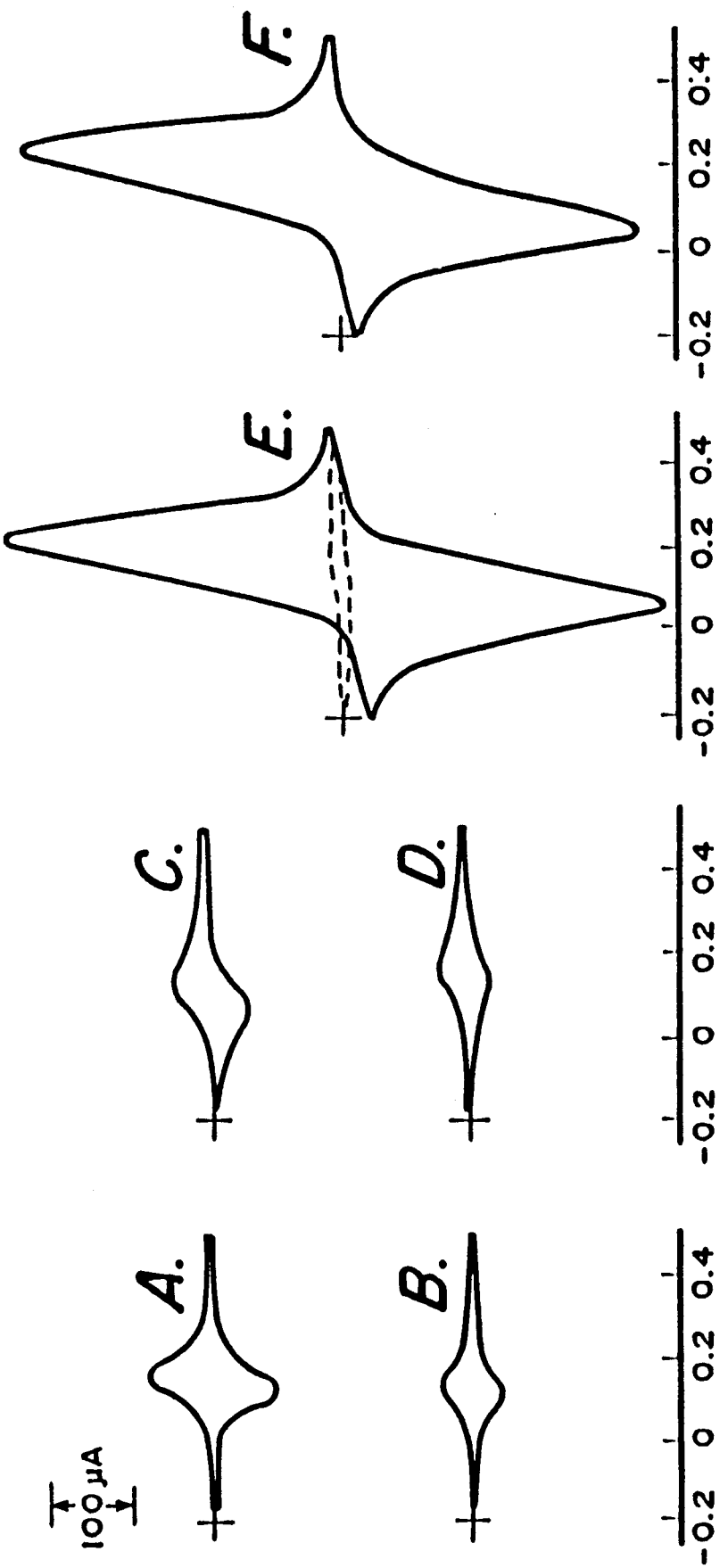
FIG. 3 is a series of steady-state cyclic voltammograms for $Fe(CN)_6^{4-}$ incorporated into simple and composite polyelectrolyte coatings on a glassy carbon electrode.

ND2: Nylon derivative #2, see FIG. 2; ND3: Nylon derivative #3, see FIG. 2; PEI = branched poly(ethyleneimine); l-PEI = linear poly(ethyleneimine); PLL = poly l-lysine.
[b]Total quantity of fixed charged sites in the polyelectrolyte coating. 1 contributed $0.45 \times 10^7$ mole cm$^{-2}$ to the value of $r_p$ in each case.
[c]Quantity of counter-ion incorporated by the coating as measured coulometrically immediately after transfer to pure supporting electrolyte solution. $Fe(CN)_6^{4-}$ was the counter-ion in each case
[d]See Table 1.
[e]See Table 1.
[f]See Table 1.
[g]$\overline{MW}$ of PVI = $7 \times 10^4$ daltons.
[h]$\overline{MW}$ of PVP = $7.5 \times 10^5$ daltons.
[i]$\overline{MW}$ of PVP = $7 \times 10^4$ daltons.
[j]$\overline{MW}$ of PVP = $1 \times 10^4$ daltons.
[k]$\overline{MW}$ of PEI = $1.8 \times 10^3$ daltons.
[l]$\overline{MW}$ of PLL = $1.8 \times 10^5$ daltons.
[m]Experiment performed using a modified hanging mercury drop electrode:

The set of steady state cyclic voltammograms in FIG. 3 compares the responses obtained immediately after each coating (which had been equilibrated with $10^{-4}$ M $Fe(CN)_6^{4-}$ was transferred to the pure supporting electrolyte solution with those that resulted 45 minutes later. The coatings prepared from pure PVI (FIG. 3A) or I (FIG. 3C) incorporated relatively little $Fe(CN)_6^{4-}$ —and much of what is incorporated is lost within 45 minutes (FIG. 3B, D; Table 1). The results obtained with the composite coating are dramatically different (FIG. 3E, F). Much more $Fe(CN)_6^{4-}$ is incorporated by the composite coating and it is lost much more slowly when the coating is transferred to a pure supporting electrolyte solution (Table II). The composite coating exhibits properties that would not be expected on the basis of the behavior of its two components alone clearly displaying synergistic enhancements of both ion-exchange capacity and retention ratio. Indeed, the retention ratio of 0.93 for the composite coating prepared from PVI and I (Table 2) is the largest measured for any cationic polyelectrolyte and is all the more remarkable in view of the unusually high diffusion coefficients of the incorporated $Fe(CN)_6^{4-}$ anions in the composite coating (Table 2).

The larger peak current obtained in FIG. 3F reflects not only greater incorporation of $Fe(CN)_6^{4-}$ but a larger effective diffusion coefficient for the anion. The significance of diffusion coefficients for reactants confined within electrode coatings has been extensively discussed and several methods for their evaluation are available. Potential-step chronocoulometry was employed and measured. The slopes, S, of the linear charge-(time)$^{\frac{1}{2}}$ plots were recorded after the loaded coating was transferred to a pure supporting electrolyte solution and allowed to stabilize for 45 minutes. The total quantity of $Fe(CN)_6^{4-}$ present in the coating at this point, $\Gamma_{45}$, was also measured just prior to the chronocoulometric measurements. The diffusion coefficient, $D_E$, is given by equation 1

$$D_E = \frac{\pi S^2 \phi}{4F^2 \Gamma^2} \quad\quad (1)$$

where $\phi$ is the coating thickness and F is Faraday's constant. To evaluate $\phi$ coatings ten to twenty times thicker than those employed experimentally were prepared and their thicknesses estimated by eye with the aid of a micrometer. This procedure is most satisfactory with composite coatings such as PVI and I which swell by factors of at least 100-fold. Values of $D_E$ obtained with a series of composite coatings are listed in the final column of Table 2. These may be compared with the values given in Table 1 for coatings prepared from single polyelectrolytes. The $D_E$ values for $Fe(CN)_6^{4-}$ in the composite electrolytes are the largest yet reported for multiply-charged counter ions in any polyelectrolyte. The largest value of $D_E$ obtained with the composite coating containing $\Gamma$ and the nylon derivative No. 3 (Table 2), is within a factor of 1.5 of the diffusion coefficient of $FE(CN)_6^{4-}$ in solution ($D = 6.5 \times 10^{-6}$ cm$^2$ s$^{-1}$). Thus, these composite coatings offer remarkably low barriers for the diffusion of the counter-ions they incorporate despite their abilities to retain the counter-ions for long periods. These two properties might have reasonably been regarded as mutually incompatible but they are both exhibited by all of the composite coatings listed in Table 2. The fact that the same combination of properties is highly desirable for catalytic applications of electrodes modified wit polyelectrolyte coatings adds to the significance of the data summarized in Table 2.

Although the quantities of $Fe(CN)_6^{4-}$ incorporated by the various coatings in Table 2 vary over a considerable range, the retention ratios, $\Gamma 45 \Gamma 0^{-1}$, and the $D_E$ values are all surprisingly insensitive to changes in the identity and molecular weight of the auxillary polyelectrolyte that is combined with copolymer I (Table 2). It seems evident that the properties of copolymer I are primarily responsible for the behavior of the composite coatings.

Of all the auxillary polyelectrolytes employed in the experiments that are summarized in Table 2, only PVI yielded sufficiently stable coatings when used alone to permit reliable evaluation of their behavior (Table 1). The remaining polyelectrolytes in Table 2 have solubilities in aqueous media that are too large to allow for stable electrode coatings to be prepared. Thus, copolymer I is responsible for the stability of the composite coatings as well as the other desirable properties described above.

The stabilizing effect of copolymer I allows long-lived coatings to be applied to a wide variety of electrode materials. Thus, in addition to glassy carbon and pyrolytic graphite, satisfactorily stable coatings have also been produced on gold, tin oxide, platinum and even a hanging mercury drop electrode (Table 2). In the latter case the coated mercury drop was readily transferred between solutions without dislodging the drop from the capillary tube from which it was suspended, a much more difficult challenge with uncoated hanging mercury drops.

Figure 4:
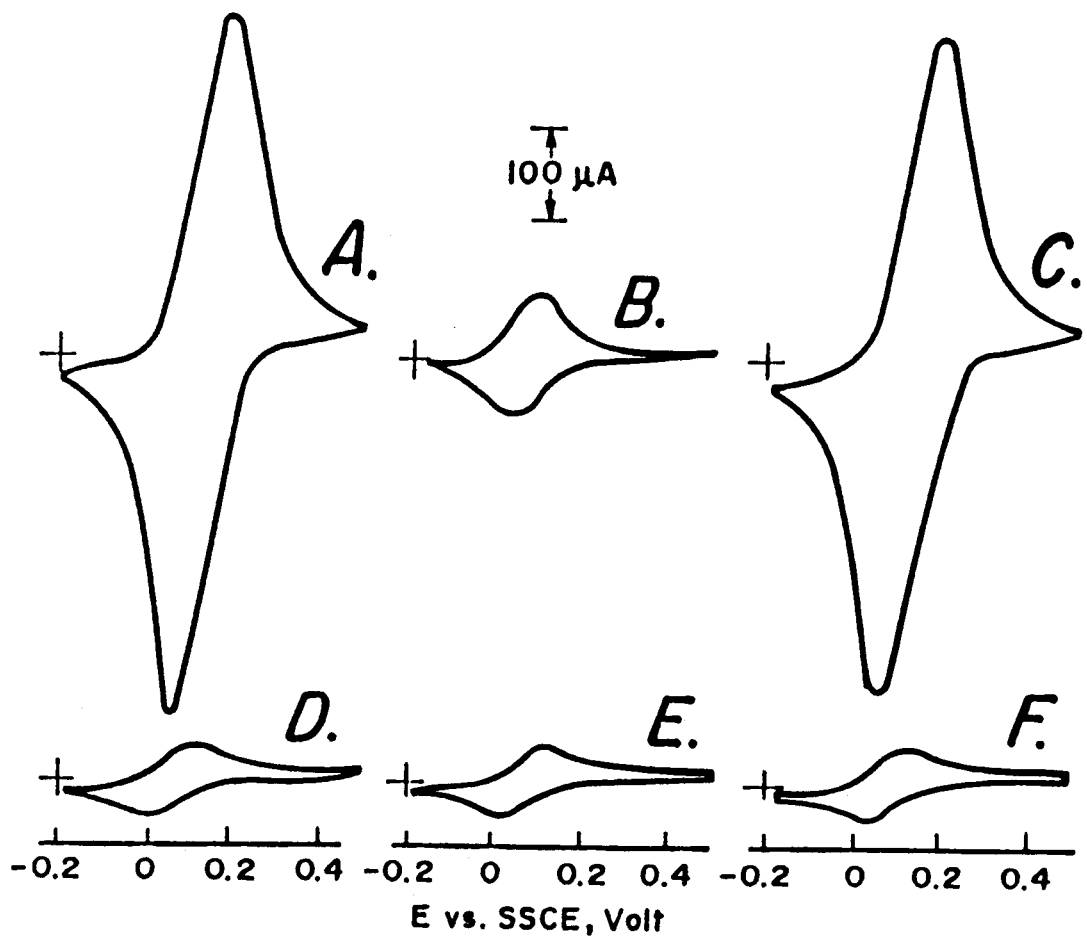
FIG. 4 is another series of steady-state cyclic voltammograms showing pH dependence of composite coatings of copolymer of the invention to incorporation of $Fe(CN)_6^{4-}$.

The values of $\Gamma_o$ in Table 2 are all well below the limit calculated from the number of cationic sites, $\Gamma_p$, provided by the composite coatings. It was of interest to determine the relative importance of the two components in the composite coatings in the electrostatic binding of the $FE(CN)_6^{4-}$ anions to the coating. This was possible in cases where the cationic sites in the auxillary polyelectrolytes were provided by protonation of basic sites because the positive charges could be removed at sufficiently high pH values. Of course, the quaternary ammonium groups responsible for the cationic sites in I retain their charge at all pH values. An example of the use of pH to alter the number of fixed charge sites within a coating consisting of a mixture of I and PVI is shown in FIG. 4. At pH 4.5 the imidizole groups in PVI ($pK_a = 8.5$) are protonated, both components of the coating are polycationic and the coating readily incorporates $Fe(CN)_6^{4-}$ (FIG. 4A). If the experiment is repeated at pH 10 the coating shows a greatly attenuated response (FIG. 4B) despite the fact that the cationic sites carried by polyelectrolyte I are still present. Transfer of the electrode back to the pH 4.5 solution of $Fe(CN)_6^{4-}$ restores most of the original response (FIG. 4C) showing that the coating remains on the electrode surface and regains its high ion-exchange capacity upon re-protonation. These results indicate that the auxillary polyelectrolyte in the mixed coatings is primarily responsible for the incorporation of $Fe(CN)_6^{4-}$. This conclusion is also consistent with the results summarized in Table 1 which show that I alone has a rather low capacity for incorporating $Fe(CN)_6^{4-}$ anions.

The behavior of composite coatings prepared from a mixture of copolymer I with various auxillary polyelectrolytes suggested that morphology might be at least as important as chemical identity in determining the important properties of the coatings, i.e., ion-exchange capacity, retention ratios, $D_E$ values and stability. To examine this proposition more directly, transmission electronmicroscopy was employed to examine coatings cast on carbon layers that were deposited on copper minigrid supports. The resulting coatings were swollen and stained with $IrCl_6^{3-}$ which was incorporated and retained by the hydrophilic portions of the polycationic coatings when they were washed with distilled water.

Micrographs obtained for a coating prepared from pure PVP exhibit an almost homogeneous appearance with little evidence of segregated domains. Similar structures resulted with all coatings prepared from the pure auxillary polyelectrolytes examined.

A micrograph of a coating prepared from the ternary copolymer indicates that the film is less homogeneous with segregation into what appears to be two types of domains. Coatings prepared from mixtures of PVP and I resemble those containing only I, indicating that, in mixtures, I acts as a template to induce the added polyelectrolyte to adopt a similar structure. The two types of structure evident in the micrographs of I and its mixture seem likely to arise from spontaneous segregation of the coatings into hydrophilic and hydrophobic domains.

The isolated more or less spherical hydrophilic domains appear to have average diameters of ca. 1000 Å when I is mixed with PVP or similar polyelectrolytes. It is suggested that this increase results from the ability of the added polyelectrolyte to induce an expansion of the hydrophilic domains generated by the structure of I. The expansion may well result from the preferential association of the added polyelectrolyte with the hydrophilic portions of I.

To make sure that the structural features seen in FIG. 4A-4C were not the result of the metal ion used for staining ($IrCl_b^{3-}$) or an artifact of the staining procedure, micrographs were also recorded for coatings stained with ferrocene and for unstained coatings treated with pure supporting electrolyte. The generally similar results obtained indicate that the domanin structures obtained were not artifacts of the staining procedure.

One of the most intriguing and appealing properties of the composite coatings is the high value of $D_E$ they provide for the incorporated counter-ions (Table 2). Similarly large values were also observed previously for the diffusion of $Fe(edta)^-$ within a poly(L-lysine)

copolymer that may well have adopted the type of domain structure.

The values of $D_E$ are so large that it seems highly unlikely that electron exchange between pairs of the oxidized and reduced reactants could contribute significantly to the measured values of $D_E$ in the way proposed by Dahms and Ruff (J. Phys. Chem., 1968, 72, 362 and Electrochim Acta, 1970, 15, 1059) and observed for Co(bpy)$_3^{2+}$(bpy=2,2'-bipyridine) incorporated in Nafion. Thus the rate constant for self-exchange between Fe(CN)$_6^{3-}$ and Fe(CN)$_6^{4-}$ would have to be ca. $10^9$ M$^{-1}$s$^{-1}$ in the composite coatings where the concentration of incorporated Fe(CN)$_6^{4-}$ was ca. 0.1 M in order for self-exchange to contribute even 10 percent to a $D_E$ value as large as $2 \times 10^{-6}$ cm$^2$s$^{-1}$.

This value, calculated from the equation of Dahms and Ruff seems unreasonably large as the rate constant for self-exchange between these two highly charged anions and is the basis for doubting that self-exchange makes a substantial contribution to the diffusional process measured by $D_E$. One is therefore led to the conclusion that the Fe(CN)$_6^{4-}$ anions confined electrostatically to the "Donnan domains" within the composite polyelectrolyte coating are able to move surprisingly rapidly across the coating.

The electron micrographs illustrate clearly the morphological differences between coatings cast from homopolyelectrolytes on the one hand, and polyelectrolyte I, containing both charged, hydrophilic groups and hydrophobic groups, on the other: Coatings of the homopolyelectrolytes appear largely featureless and homogeneous while polyelectrolyte I yields coatings that appear segregated into two types of domains. Of even greater importance to the present study was the observation that polyelectrolyte I appears to retain its domain-forming tendency when mixed with auxillary polyelectrolytes. The resulting coatings assume structures in which polyelectrolyte I apparently serves as a template that controls the morphology adopted by the composite coating. Coatings with structures similar to that in FIG. 4C developed when polyelectrolyte I was mixed with several other auxillary polyelectrolytes indicating that the spontaneous tendency of I to form segregated domains dictates the morphologies adopted by the mixtures. However, the second polyelectrolyte in the mixtures is not an inert component. Its presence is essential to produce coatings that are highly swollen and exhibit hydrophilic domains with ion exchange capacities much greater than those of polyelectrolyte I alone.

Mixing polyelectrolyte I with the auxillary polyelectrolytes also yields coatings that are much longer-lived than those obtained from the rather soluble auxillary polyelectrolytes alone. The greater coating stability probably results from some form of association of the polymeric chains of the two components in the mixtures coupled with a strong hydrophobic interaction between the electrode surface and the styrene groups of polyelectrolyte I. Whatever the molecular basis of the greater stability of the composite coatings, the data collected in Tables 1 and 2 show clearly that a property other than their chemical compositions must be important in determining the ion-exchange capacities and diffusional rates of incorporated counter-ions exhibited by the composite coatings. However, a two-domain structure alone is not adequate to ensure these desirable properties. Coatings prepared from polyelectrolyte I alone exhibit a two-domain structure but have much lower ion-exchange capacities and retain incorporated reactants rather poorly when transferred to pure supporting electrolyte solutions (Table 1). Thus, the presence of segregated domains within polyelectrolyte coatings appears to be a necessary but not sufficient condition for obtaining the desirable properties.

The idea that certain types of polyelectrolyte coatings on electrodes are made up of two (or more) domains has been suggested in previous studies and considerable evidence supporting a segregated domain structure for Nafion membranes is available. However, the notion that useful domain structures can be induced in polyelectrolyte coatings by using a strong domain-forming polymer as a template that controls the structure of coatings obtained from mixtures containing other components that have desirable properties, is new.

Composite coating in which templating polymers define the overall morphology and auxillary polyelectrolytes establish the electrostatic and chemical environment experienced by incorporated reactants is very broad and can be applied to tailor the properties of coatings to meet specific requirements of numerous practical applications such as separators in batteries or electrolyzers.

The copolymer of the invention can be varied considerably within the scope of the invention. The hdrophobic backbone can be substituted with other hydrophobic groups such as fluorocarbon groups and the copolymer can be a bock rather than a random copolymer. The cationic groups can be partially or wholly based on P, As or S rather than N. The films can be utilized as ion exchange media as a free standing membrane, a belt or can be chopped into beads or chips.

The copolymer and mixed polymers will find use in electroplating and/or circuit board etching. Membranes of the mixed polymers can be used in applications which take advantage of the pH switching properties of these materials.

It is to be realized that only preferred embodiments of the invention have been described and that numerous substitutions, modifications and alterations are permissible without departing from the spirit and scope of the invention as defined in the following claims.

We claim:

1. A mixed polymer containing 10-90 percent by weight of a random, ternary, styrene copolymer in which 10-80 molecular percent of the phenyl groups of the styrene units are unsubstituted; 10-35 molecular percent of the phenyl groups of the styrene units are substituted with quaternized trialkylamine groups in which each alkyl group is the same and contains from 1 to 6 carbon atoms, and 15-45 molecular percent of the phenyl groups of the styrene units are substituted with quaternized tri-(hydroxyalkyl) amine groups in which each hydroxyalkyl is the same and contains 1 to 6 carbon atoms; and the remainder of the mixed polymer consisting essentially of a cationic, polyelectrolyte copolymer and said mixed polymer segregating into domains having a dimension of at least 100 Angstroms.

2. A mixed polymer according to claim 1 in which the ternary copolymer is formed of randomly connected units of the following structure:

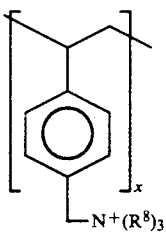

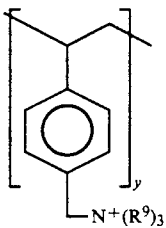

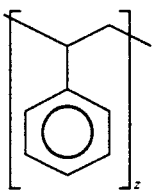

where x is 0.1 to 0.35, y is 0.15 to 0.45, z is 0.15 to 0.45, $R^8$ is the same alkyl of 1 to 6 carbon atoms and $R^9$ is the same hydroxyalkyl of 1–6 carbon atoms.

3. A mixed polymer according to claim 1 in which the triakyl groups are ethyl and the tri(hydroxyalkyl) groups are hydroxethyl.

4. A mixed polymer according to claim 1 in which the polyelectrolyte is a soluble linear branched homopolymer or copolymer substituted with cationic hydrophilic groups selected from amide, amine, or imide.

5. A mixed polymer according to claim 4 in which the polyelectrolyte is selected from the group consisting of polyvinylimidazole, polyvinyl-pyridine, linear synthetic polyamides, polyethylene imine and poly-1-lysine.

6. A mixed polymer according to claim 5 in which the polyelectrolyte is polyvinyl-pyridine.

7. A mixed polymer according to claim 1 in which the domains are from 100 to 5000 Å in diameter.

8. A mixed polymer according to claim 1 in which the mixed polymer further contains a polymerizable compound reactive with said ternary copolymer.

9. A mixed polymer according to claim 8 in which the polymerizable compound is addition polymerizable.

10. A mixed polymer according to claim 9 in which the polymerizable compound is radiation polymerizable.

11. A mixed polymer according to claim 10 in which the polymerizable compound is selected from isoprene, styrene or divinyl benzene.

12. A substrate coated with a film of the mixed polymer of claim 1.

13. A coated substrate according to claim 12 in which the substrate is an electrode.

14. A coated substrate according to claim 13 in which the electrode has a carbon surface.

* * * * *